United States Patent [19]

Yoneda

[11] Patent Number: 4,557,172
[45] Date of Patent: Dec. 10, 1985

[54] SAW BLADE

[75] Inventor: Akiyoshi Yoneda, Akashi, Japan

[73] Assignee: Amada Company, Limited, Japan

[21] Appl. No.: 684,180

[22] Filed: Dec. 24, 1984

Related U.S. Application Data

[63] Continuation of Ser. No. 456,536, Jan. 7, 1983, abandoned.

[30] Foreign Application Priority Data

Jan. 13, 1982 [JP] Japan .................................. 57-2650

[51] Int. Cl.[4] ............................................. B23D 61/00
[52] U.S. Cl. ........................................ 83/848; 83/850
[58] Field of Search .......................... 83/846, 848–850, 83/851–855

[56] References Cited

U.S. PATENT DOCUMENTS

| Re. 31,433 | 11/1983 | Clark ................................. 83/848 X |
| 853,255 | 5/1907 | Miller ..................................... 83/848 |
| 1,512,625 | 10/1924 | Miller ..................................... 83/848 |
| 1,955,137 | 4/1934 | Lee . |
| 2,510,462 | 6/1950 | Christenson . |
| 3,171,457 | 3/1965 | Brown .............................. 83/846 X |
| 3,576,061 | 4/1971 | Pahlitzsch ........................ 83/848 X |
| 3,576,200 | 4/1971 | Elmes ..................................... 83/848 |
| 4,232,578 | 11/1980 | Stellinger et al. ................ 83/855 X |

FOREIGN PATENT DOCUMENTS

| 223079 | 7/1959 | Australia ............................... 83/847 |
| 1440141 | 6/1976 | United Kingdom .................. 83/846 |

Primary Examiner—Frank T. Yost
Attorney, Agent, or Firm—Wigman & Cohen

[57] ABSTRACT

The present invention relates to a saw blade comprising a plurality of teeth, each having a tooth tip. Each of the teeth is provided with first and second rake angles and first and second relief angles. The tooth tips of the teeth are located on different levels. The plurality of teeth may include a plurality of tooth groups in each of which some of the teeth are angularly set and others of the teeth are not angularly set.

3 Claims, 7 Drawing Figures

SAW BLADE

This application is a continuation of application Ser. No. 456,536, filed Jan. 7, 1983, now abandoned.

BACKGROUND OF THE INVENTION

1. Field of the Invention

The present invention relates to saw blades such as band saw blades, circular saw blades and hack saw blades which are used for bandsaw machines, hack saw machines and circular saw machines to cut metallic materials. More particularly, the present invention pertains to blades of this type having a novel form and arrangement of teeth which increase cutting rate and blade life, decrease cutting noise and vibration, resist deviation from their normal cutting course and have high tooth strength.

2. Description of the Prior Art

There are several kinds of saw blades such as bandsaw blades, hack saw blades and circular saw blades which are used in metal cutting machines such as bandsaw machines, hack saw machines and circular saw machines to cut metallic materials. As a matter of course, it is desired that such a saw blade have a high cutting rate and a long life and make a cutting action with reduced noise and vibration without deviating from its normal cutting course. These features are desired in saw blades especially for cutting materials such as stainless steels and metal alloys which are generally hard and tough and are mostly subject to work hardening. In order to satisfy these desires, it has been heretofore attempted to improve the blade materials and also tip cutting edges of saw blades with cemented carbides. However, the conventional saw blades have failed to improve in cutting rate and life, reduce cutting noise and vibration and resist deviating from their normal cutting course especially for cutting difficult-to-cut materials. Although the conventional saw blades are able to cut easy-to-cut materials at higher cutting rates with longer lives, they are still unable to cut easy-to-cut materials with reduced noise and vibration without deviating from their normal cutting course. For example, a saw blade disclosed in the U.S. Pat. No. 4,232,528 has been improved in teeth strength, but it cannot cut into difficult-to-cut materials but will have a tendency to only scratch them even with a large feeding force with a result that work hardening will occur to cause a lower cutting rate and more noise and vibration.

SUMMARY OF THE INVENTION

It is an object of the invention to provide a saw blade of the type having characteristics such as higher cutting rate, longer blade life, reduced cutting noise and vibration and high tooth strength especially in cutting difficult-to-cut materials including those which are subject to work hardening.

It is another object of the invention to provide a saw blade of the type having characteristics such as reduced cutting noise and vibration especially in cutting easy-to-cut materials.

It is still another object of the invention to provide a saw blade which will resist bending and deviating from its normal cutting course during cutting operations.

In order to attain these objects of the present invention a saw blade is provided with first and second rake angles and first and second relief angles and is so designed that the teeth are varied in height and the pitches or distances betwen the teeth may be varied and furthermore the gullets betwen the teeth may be varied in depth.

Other and further objects and advantages of the present invention will be apparent from the following description and accompanying drawings which, by way of illustration, show preferred embodiments of the present invention and the principle thereof.

DESCRIPTION OF THE PREFERRED EMBODIMENTS

Figure 1:
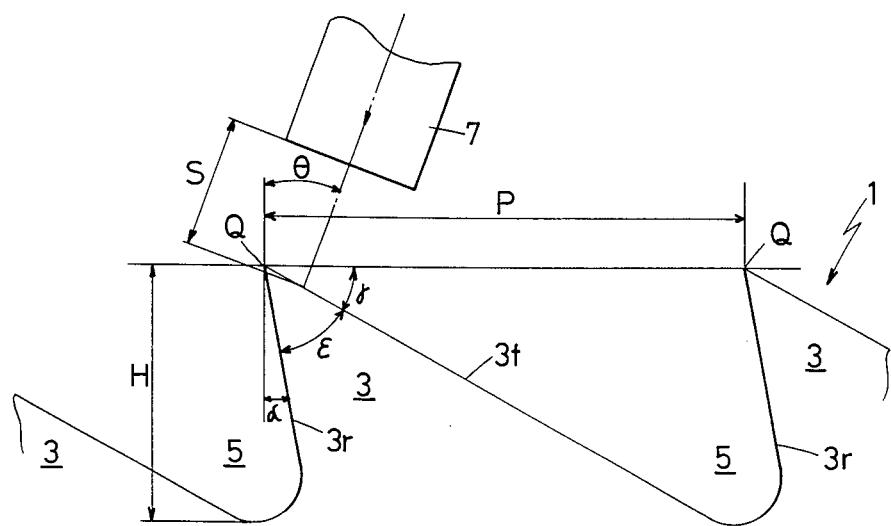
FIG. 1 is a side view showing a segment of a conventional typical saw blade for the description of the present invention.

Referring now to FIG. 1, a segment of a conventional saw blade, which is generally designated by the numeral 1 and may be a bandsaw blade, hack saw blade or circular saw blade for cutting metallic materials, is typically shown for the convenience of the description of the present invention. The saw blade 1 is, of course, provided with a number of teeth, each of which is generally designated by the numeral 3 and have a tooth tip Q, in such a manner as to form gullets 5 between the teeth 3. Each of the teeth 3 is so formed as to be sharp to a point to have the tooth tip Q having a tooth tip angle $\epsilon$ and also have a rake surface 3r and a relief surface 3f so that it can make a cutting action when moved with the rake surface 3r preceding the relief surface 3f. The rake surface 3r of the tooth 3 is formed to have an angle $\alpha$ which is referred to as rake angle and is measured with respect to a baseline extending from the tip Q in a direction perpendicularly downwardly from a line joining the tips of adjacent teeth. However, in case of a circular saw blade, the rake angle $\alpha$ is measured with respect to a line extending from the tip of the tooth radially inwardly to the center of the blade. The relief surface 3f is formed to have an angle $\gamma$ which is referred to as relief angle and is measured with respect to a line extending between the tips of adjacent teeth in the case of band saw blades and hack saw blades and with respect to a tangent to the blade radius at the tip of the tooth in the case of a circular saw blade. The spacing between successive tooth tips Q indicated by P is the pitch, and the height of each tooth 3 indicated by H is measured from a line connecting successive tips Q perpendicularly to the bottom of gullet 5.

Figure 2:
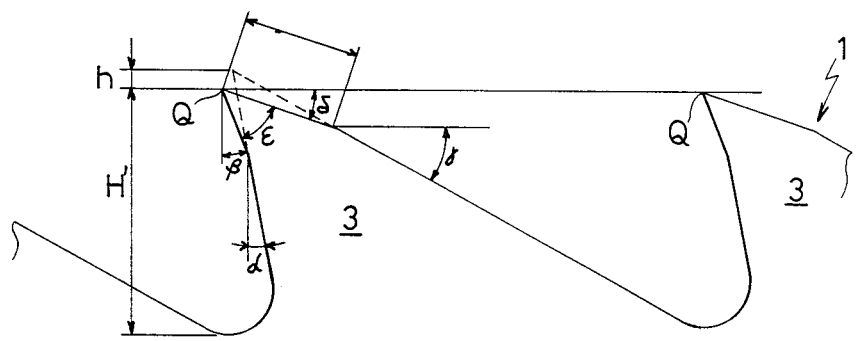
FIG. 2 is a side view showing a segment of a saw blade according to the present invention.

Referring to FIG. 2 in addition to FIG. 1, the tooth tip Q of the tooth 3 of the blade 1 shown in FIG. 1 is deformed in the direction shown by the arrow, at an angle of $\theta$ by a suitable pressing means 7 such as a punch as shown in FIG. 1 to form a greater rake angle, since a greater rake angle will improve the cutting performance. More particularly, the tooth tip Q of the tooth 3 of the saw blade 1 shown in FIG. 1 is so deformed as to have a tooth tip angle of $\epsilon$, so that the rake angle $\alpha$ shown in FIG. 1 is deformed to a greater angle of $\beta$ and the relief angle $\gamma$ shown in FIG. 1 is deformed to a smaller angle of $\delta$. Accordingly, the rake angle is formed into a first rake angle of $\beta$ and a second rake angle of $\alpha$, and the relief angle is formed into a first relief angle of $\delta$ and a second relief angle of $\gamma$. Thus, by means of the plastic deformation to the tooth tip Q of the tooth 3, the height H of the tooth 3 is reduced into H' by the amount of h without decreasing the width of the tooth 3 with the result that the rake angle $\alpha$ is increased into $\beta$ and the relief angle $\gamma$ is decreased into $\delta$ so that the cutting performance may be improved. It will be readily understood that the amount of deformation of the tooth 3 can be easily adjusted or controlled by adjustng or controlling the stroke S of the pressing means 7. In a preferred embodiment, the first rake angle $\beta$ is a positive angle of 7° to 20° and the first relief angle $\delta$ is a relatively great angle of 24° to 30° and also the length of the portion of the first relief surface of the first relief angle $\delta$ is 1.00 mm (0.040 in) to 2.00 mm (0.077 in) from the tooth tip Q. In this connection, it will be understood that the tooth 3 of the saw blade 1 can be cut or milled to have the first and second rake angles $\beta$ and $\alpha$ and the first and second relief angles $\delta$ and $\gamma$ without using the pressing means 7.

Figure 3:
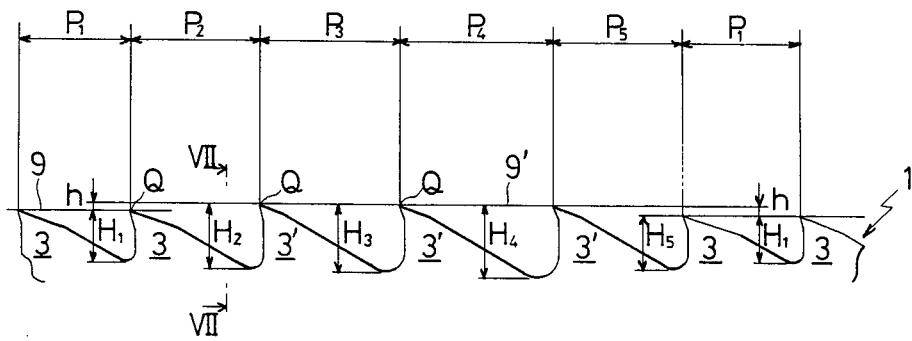
FIG. 3 is a side view showing a segment of a saw blade of a first embodiment of the present invention and the height of the each tooth of a saw blade segment.

Referring to FIG. 3, the saw blade 1 according to the present invention is formed with smaller teeth 3 and larger teeth 3' each of which is so designed as to have first and second rake angles $\beta$ and $\alpha$ and first and second relief angles $\delta$ and $\gamma$ as shown in FIG. 2. The smaller and larger teeth 3 and 3' are varied in height as designated by $H_1$, $H_2$, $H_3$, $H_4$ and $H_5$ and also they are formed on the saw blade 1 at varied pitches as shown by $P_1$, $P_2$, $P_3$, $P_4$ and $P_5$. Also, the smaller teeth 3 and the larger teeth 3' which are varied in height are unevenly formed on different levels so that their tooth tips Q are aligned with cutting lines 9 and 9', respectively, which are set apart by a height h. Thus, the saw blade 1 is so formed that the smaller and larger teeth 3 and 3', each of which is designed as shown in FIG. 2, are varied in height as $H_1$, $H_2$, $H_3$, $H_4$ and $H_5$ and are formed with their tooth tips Q on the different levels of cutting lines 9 and 9' at varied pitches designated by $P_1$, $P_2$, $P_3$, $P_4$ and $P_5$.

In the above described arrangement, the feeding force, which is applied to the saw blade 1 toward a material to be cut during a cutting operation, will be concentrated on the larger teeth 3' so that each of them can cut into the material with the concentrated larger feeding force by a larger feeding amount. Thus, the saw blade 1 having the smaller teeth 3 and the larger teeth 3' can cut with ease even a difficult-to-cut material of work hardening character, since the larger teeth 3' will cut into and remove a hard layer which will be produced in a kerf of the material being cut because of work hardening. Therefore, the saw blade 1 will make a cutting action at a higher cutting rate, and also it will be increased in life since it will not scratch a material to be cut during a cutting operation. Also, the smaller teeth 3 and larger teeth 3' formed at the varied pitches $P_1$, $P_2$, $P_3$, $P_4$ and $P_5$ will act on a material to be cut at unequal intervals, and also they will be varied in natural frequency because of the varied heights $H_1$, $H_2$, $H_3$, $H_4$ and $H_5$. Thus, the saw blade 1 will be restrained from resonating during a cutting operation because of the varied pitches and the varied heights of the smaller teeth 3 and larger teeth 3' with a result that there will be a large reduction in vibration and noise. In this connection, of course it is to be noted that the saw blade 1 will be restrained from resonating and will have reduced vibration and noise only because of the varied pitches of the smaller teeth 3 and larger teeth and 3' and vibration and noise will be further reduced because of the varied heights thereof.

Figure 4:
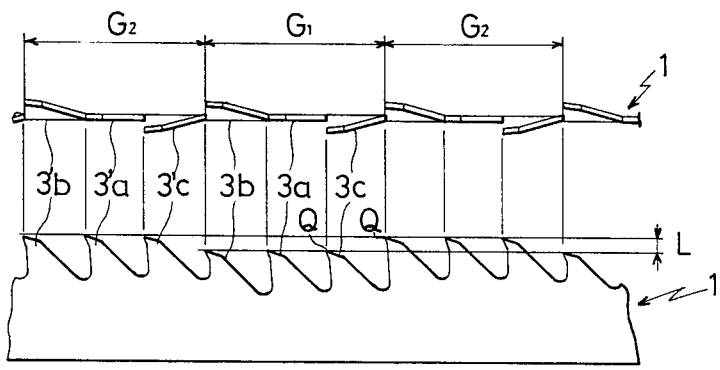
FIG. 4 shows a side view at the lower portion and a top plan view at the upper portion of a segment of a saw blade of the second embodiment of the present invention.

Referring to FIG. 4, the smaller teeth 3 and the larger teeth 3' of the saw blade 1, which are different in level of their tooth tips Q by length L, are formed so that there is gathered a plurality of smaller groups $G_1$ and larger groups $G_2$, respectively, in each of which some of the teeth are set angularly sideways. In the preferred embodiment shown in FIG. 4, each of the smaller groups $G_1$ consists of three smaller teeth 3a, 3b and 3c as a trio in such a manner that the tooth 3a is located between the teeth 3b and 3c without being angularly set and the teeth 3b and 3c are angularly set sideward in opposite directions. Likewise, each of the larger groups $G_2$ consists of three larger teeth 3'a, 3'b and 3'c as a trio in which the tooth 3'a is located between the teeth 3'b and 3'c without being angularly set and the teeth 3'b and 3'c are angularly set in opposite directions. Also, the smaller groups $G_1$ of the smaller teeth 3a, 3b and 3c and the larger groups $G_2$ of the larger teeth 3'a, 3'b and 3'c are alternately formed on the saw blade 1 to alternate therealong successively.

Figure 7:
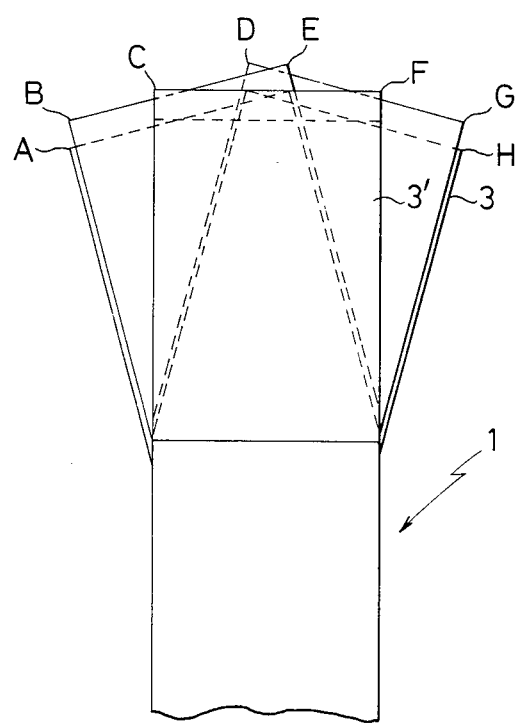
FIG. 7 is a cross-sectional view of the saw blade taken along the lines VII—VII of FIG. 3.

In the above described arrangement, the tooth tips Q of the smaller teeth 3 and larger teeth 3' are formed with their corners projecting in a variety of directions by different heights or on different levels as shown by A, B, C, D, E, F, G and H in FIG. 7 so that they can effectively act on a variety of portions of a material being cut. Thus, the saw blade 1 will resist deviating from its normal cutting course during cutting operations, since the saw blade 1 will act on a variety of portions of the material being cut by means of the corners A, B, C, D, E, F, G and H.

Figure 5:
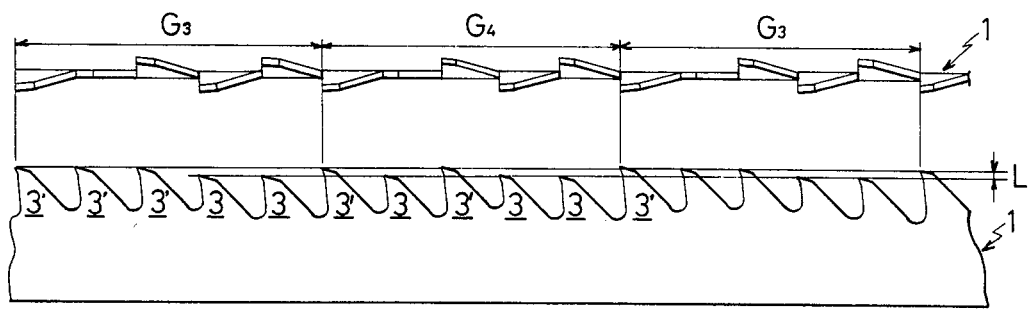
FIG. 5 shows a side view at the lower portion and a top plan view at the upper portion of a segment of a saw blade of the third embodiment of the present invention.

Referring to FIG. 5, there is shown another embodiment of the present invention in which the saw blade 1 is provided with two types of tooth groups $G_3$ and $G_4$ each consisting of five smaller and larger teeth 3 and 3' as a pentad in a manner such that the tooth groups $G_3$ and $G_4$ are alternately formed therealong. In each tooth group $G_3$, two smaller teeth 3 are angularly set in opposite directions and three larger teeth 3' are formed in all the same manner as the larger teeth 3'a, 3'b and 3'c of the larger group $G_2$ which is shown in FIG. 4. In each tooth group $G_4$, two larger teeth 3' are formed to be set angularly in opposite directions, one smaller tooth 3 is formed between the two larger teeth 3' without being set angularly and two smaller teeth 3 are formed next to one of the larger teeth 3' to be set angularly.

Figure 6:
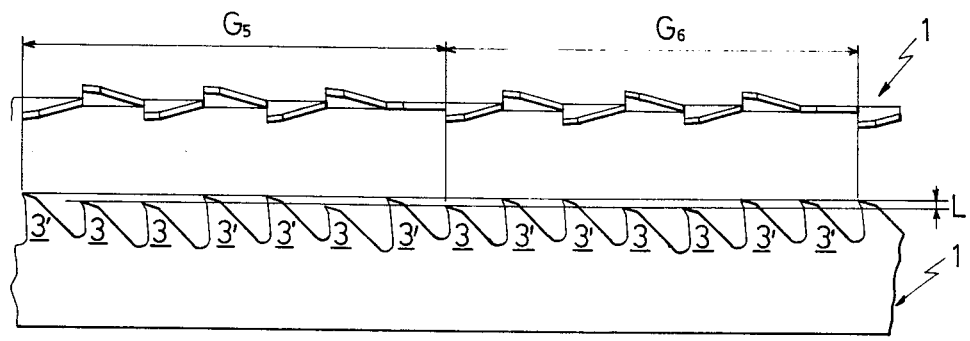
FIG. 6 shows a side view at the lower portion and a top plan view at the upper portion of a segment of a saw blade of the fourth embodiment of the present invention.

Referring to FIG. 6, there is shown another embodiment of the present invention in which the saw blade 1 is provided with two types of tooth groups $G_5$ and $G_6$ each consisting of seven smaller and larger teeth 3 and 3' as a heptad in a manner such that the tooth groups $G_5$ and $G_6$ are alternately formed therealong. The groups $G_5$ and $G_6$ are similar to each other in that three smaller teeth 3 and three larger teeth 3' are angularly set in opposite directions and one larger tooth are not angularly set, but they are different from each other in that the smaller and larger teeth 3 and 3' are formed in different orders.

As has been so far described in the above, the saw blade 1 according to the present invention will increase cutting rate, have a longer life, decrease cutting noise and vibration and also will resist deviating from its normal cutting course. The saw blade 1 will have increased cutting rate, life and tooth strength, since each tooth is provided with first and second rake angles, first and second relief angles, and also the teeth are varied in height. The saw blade 1 will have decreased vibration and noise since its teeth are formed at unequal pitches and also they are varied in height. Furthermore, the saw blade 1 will resist deviating from its normal cutting course since the tooth tips of its teeth are projected in a variety of directions by different heights or on different levels.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A saw blade for cutting hardened metals comprising:
    a plurality of cutting teeth, each tooth having a tooth tip having first and second rake angles and first and second relief angles;
    a gullet between each tooth, said gullets being of varying depth;
    the tips of said teeth being set at varying heights;
    some of said teeth being angularly set and others of said teeth being disposed in the plane of the blade;
    said teeth being set on said saw blade at varied pitches;
    the teeth being set in groups of like numbers of teeth with all the teeth in each group being of the same height;
    wherein the height of the teeth in each group differ from the height of the teeth in any adjacent group;
    whereby vibration and noise are reduced because the teeth are varied in natural frequency.

2. The saw blade according to claim 1, wherein the teeth are set in groups of three and the center tooth in each group is disposed in the plane of the blade and the first and last tooth of each group are angularly disposed in opposite directions.

3. The saw blade according to claim 1, wherein the teeth are set in groups of seven and only the last tooth in each group is disposed in the plane of the saw blade.

* * * * *